(12) United States Patent
Tanaka et al.

(10) Patent No.: US 11,359,256 B2
(45) Date of Patent: *Jun. 14, 2022

(54) HIGH-STRENGTH COLD-ROLLED STEEL SHEET AND METHOD FOR MANUFACTURING SAME

(71) Applicant: JFE STEEL CORPORATION, Tokyo (JP)

(72) Inventors: Takaaki Tanaka, Tokyo (JP); Yuki Toji, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 16/957,104

(22) PCT Filed: Dec. 13, 2018

(86) PCT No.: PCT/JP2018/045967
§ 371 (c)(1),
(2) Date: Jun. 23, 2020

(87) PCT Pub. No.: WO2019/131188
PCT Pub. Date: Jul. 4, 2019

(65) Prior Publication Data
US 2020/0392598 A1   Dec. 17, 2020

(30) Foreign Application Priority Data
Dec. 26, 2017 (JP) .............................. JP2017-249134

(51) Int. Cl.
  C21D 9/46 (2006.01)
  B21B 3/02 (2006.01)
(Continued)

(52) U.S. Cl.
CPC .................. *C21D 9/46* (2013.01); *B21B 3/02* (2013.01); *B32B 15/013* (2013.01); *C21D 6/005* (2013.01);
(Continued)

(58) Field of Classification Search
CPC .... C23C 2/06; C23C 2/28; C23C 2/40; C22C 38/001; C22C 38/002; C22C 38/005;
(Continued)

(56) References Cited

U.S. PATENT DOCUMENTS 10,626,485 B2    4/2020  Obata et al.
2017/0204490 A1  7/2017  Kawasaki et al.
(Continued)

FOREIGN PATENT DOCUMENTS

JP   2013237917 A    11/2013
JP   WO2016021193 A1  4/2017
(Continued)

OTHER PUBLICATIONS

Feb. 5, 2019, International Search Report issued in the International Patent Application No. PCT/JP2018/045967.
(Continued)

*Primary Examiner* — Jenny R Wu
(74) *Attorney, Agent, or Firm* — Kenja IP Law PC (57) ABSTRACT

Provided are a high-strength cold-rolled steel sheet that has a tensile strength of 1320 MPa or more, excellent ductility and stretch flangeability, and a low failure rate in a hole expanding test, and a method for manufacturing the same. A high-strength cold-rolled steel sheet comprises a specific composition, wherein a total area ratio of ferrite and bainitic ferrite is 10% to 50%, an area ratio of retained austenite (RA) is more than 15% and 50% or less, an area ratio of tempered martensite is more than 15% and 60% or less, a ratio of RA with an aspect ratio of 0.6 or less is 70% or more,
(Continued)

a ratio of RA with an aspect ratio of 0.6 or less in ferrite grain boundaries is 50% or more, and an average KAM value of bcc phase is 1° or less.

8 Claims, 1 Drawing Sheet

(51) Int. Cl.
| | |
|---|---|
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/34* | (2006.01) |
| *C22C 38/38* | (2006.01) |
| *C22C 38/60* | (2006.01) |
| *C23C 2/06* | (2006.01) |
| *C23C 2/28* | (2006.01) |
| *C23C 2/40* | (2006.01) |

(52) U.S. Cl.
CPC ........... *C21D 6/008* (2013.01); *C21D 8/0205* (2013.01); *C21D 8/0226* (2013.01); *C21D 8/0236* (2013.01); *C21D 8/0247* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/34* (2013.01); *C22C 38/38* (2013.01); *C22C 38/60* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/008* (2013.01)

(58) Field of Classification Search
CPC ....... C22C 38/008; C22C 38/02; C22C 38/04; C22C 38/06; C22C 38/08; C22C 38/12; C22C 38/14; C22C 38/16; C22C 38/34; C22C 38/38; C22C 38/60; C21D 6/005; C21D 6/008; C21D 1/26; C21D 2211/001; C21D 2211/002; C21D 2211/005; C21D 2211/008; C21D 8/0205; C21D 8/0226; C21D 8/0236; C21D 8/0247; C21D 8/0273; C21D 9/46; B32B 15/013; B21B 3/02
See application file for complete search history.

(56) References Cited

U.S. PATENT DOCUMENTS

| | | |
|---|---|---|
| 2017/0211163 A1 | 7/2017 | Kawasaki et al. |
| 2018/0002800 A1 | 1/2018 | Hasegawa et al. |
| 2018/0057916 A1* | 3/2018 | Obata ................ C22C 38/001 |

FOREIGN PATENT DOCUMENTS

| | | |
|---|---|---|
| JP | 2018178248 A | 11/2018 |
| WO | 2016021193 A1 | 2/2016 |
| WO | 2016021197 A1 | 2/2016 |
| WO | 2016113789 A1 | 7/2016 |
| WO | 2016132680 A1 | 8/2016 |

OTHER PUBLICATIONS

Nov. 29, 2021, Office Action issued by the Korean Intellectual Property Office in the corresponding Korean Patent Application No. 10-2020-7021455 with English language concise statement of relevance.

* cited by examiner

HIGH-STRENGTH COLD-ROLLED STEEL SHEET AND METHOD FOR MANUFACTURING SAME

TECHNICAL FIELD

The present disclosure relates to a high-strength cold-rolled steel sheet and a method for manufacturing the same. The present disclosure specifically relates to a high-strength cold-rolled steel sheet that has high strength, i.e., a tensile strength (TS) of 1320 MPa or more, favorable ductility and stretch flangeability, and a low failure rate in a hole expanding test and is suitable for parts of transportation machines such as vehicles, and a method for manufacturing the same.

BACKGROUND

High-strength cold-rolled steel sheets have been conventionally used in automotive body parts and the like (for example, WO 2016/132680 A1 (PTL 1) and WO 2016/021193 A1 (PTL 2)). In recent years, there has been a demand to improve the fuel efficiency of vehicles for global environment protection, and the use of high-strength cold-rolled steel sheets having a tensile strength of 1320 MPa or more has been promoted. There has also been a growing demand to improve the crashworthiness of automobiles. To ensure the safety of vehicle occupants at the time of crash, the use of high-strength cold-rolled steel sheets having very high strength, i.e. a tensile strength of 1460 MPa or more, as structural parts such as framework parts of automotive bodies has been studied.

CITATION LIST

Patent Literatures

PTL 1: WO 2016/132680 A1
PTL 2: WO 2016/021193 A1

SUMMARY

Technical Problem

Typically, a steel sheet decreases in ductility with an increase in strength. A steel sheet having low ductility cracks in press forming. To work a high-strength steel sheet as automotive parts, the high-strength steel sheet needs to have not only high strength but also high ductility. A steel sheet may be also required to have excellent stretch flangeability as one index of formability. For example, the stretch flangeability is evaluated as favorable in the case where the average value of hole expansion ratios obtained in a predetermined hole expanding test is high.

However, even when the steel sheet has a high average value of hole expansion ratios (average hole expansion ratio), as the number of tests increases, a value considerably lower than the average value is measured occasionally. The probability that a value considerably lower than the average value is measured is referred to as the failure rate in the hole expanding test. A steel sheet having a high failure rate in the hole expanding test has a high probability of being a failure in actual pressing. Such failures cannot be ignored when forming a large number of parts in mass production. To reduce the failure rate of press forming, a steel sheet having a low failure rate in the hole expanding test is needed.

There is thus a need for a steel sheet that has high strength, i.e., a tensile strength of 1320 MPa or more, excellent ductility and stretch flangeability, and a lower failure rate in the hole expanding test. Conventional cold-rolled steel sheets are insufficient in any of these properties.

It could therefore be helpful to provide a high-strength cold-rolled steel sheet that has a tensile strength of 1320 MPa or more, excellent ductility and stretch flangeability, and a low failure rate in a hole expanding test, and a method for manufacturing the same.

Solution to Problem

As a result of careful examination, we discovered that, in the case where a lot of massive retained austenite with a high aspect ratio contained in a steel sheet is exposed on a punched end surface during punching prior to a hole expanding test, end surface cracking is induced and the hole expansion ratio decreases considerably. We also discovered that, in the case where acicular retained austenite with a low aspect ratio exists in ferrite grain boundaries with an orientation difference of 40° or more, the end surface cracking is suppressed.

We further discovered that a steel sheet having a microstructure in which the fraction of acicular retained austenite with a low aspect ratio is high, acicular retained austenite with a low aspect ratio mainly exists in ferrite grain boundaries with an orientation difference of 40° or more, and the average KAM value of bcc phase is 1° or less has excellent stretch flangeability and a markedly low failure rate in the hole expanding test.

We further discovered that a steel sheet whose microstructure satisfies these conditions can be manufactured by subjecting a cold-rolled steel sheet to annealing three times under specific conditions.

The present disclosure is based on these discoveries and further studies.

Advantageous Effect

It is thus possible to provide a high-strength cold-rolled steel sheet that has a tensile strength of 1320 MPa or more, excellent ductility and stretch flangeability, and a low failure rate in a hole expanding test, and a method for manufacturing the same.

The high-strength cold-rolled steel sheet according to the present disclosure is suitable for parts of transportation machines such as vehicles and structural steel materials such as construction steel materials. According to the present disclosure, transportation machine parts can be made stronger and thinner than ever before, and applications of high-strength cold-rolled steel sheets can be further expanded. This yields significantly advantageous effects in industrial terms.

DETAILED DESCRIPTION

<Composition>

The composition (chemical composition) of the high-strength cold-rolled steel sheet according to the present disclosure will be described below. While the unit of the content of each element in the chemical composition is "mass %", the content is expressed simply in "%" unless otherwise specified.

C: More than 0.18% and 0.45% or Less

C is an element that stabilizes austenite, ensures the desired area ratio of retained austenite, and effectively contributes to improved ductility. Moreover, C increases the hardness of tempered martensite and contributes to higher strength. To sufficiently achieve the effects, the C content needs to be more than 0.18%. The C content is therefore more than 0.18%, preferably 0.19% or more, and more preferably 0.20% or more. If the C content is as high as more than 0.45%, an excessive amount of tempered martensite is formed, and ductility and stretch flangeability decrease. The C content is therefore 0.45% or less, preferably 0.43% or less, and more preferably 0.42% or less.

Si: 0.5% or More and 2.5% or Less

Si suppresses the formation of carbide (cementite) and facilitates the concentration of C in austenite to stabilize austenite, thus contributing to improved ductility of the steel sheet. Si dissolved in ferrite improves strain hardenability, and contributes to improved ductility of ferrite. To sufficiently achieve the effects, the Si content needs to be 0.5% or more. The Si content is therefore 0.5% or more, preferably 0.8% or more, and more preferably 1.0% or more. If the Si content is more than 2.5%, not only the effect of suppressing the formation of carbide (cementite) and contributing to stable retained austenite is saturated, but also an excessive amount of Si dissolves in ferrite, which causes a decrease in ductility. The Si content is therefore 2.5% or less, preferably 2.4% or less, and more preferably 2.3% or less.

Mn: More than 2.5% and 4.0% or Less

Mn is an austenite-stabilizing element and contributes to improved ductility by stabilizing austenite. Mn also enhances quench hardenability to facilitate the formation of tempered martensite and contribute to higher strength of the steel sheet. To sufficiently achieve the effects, the Mn content needs to be more than 2.5%. The Mn content is therefore more than 2.5%, and preferably 2.7% or more. If the Mn content is more than 4.0%, tempered martensite forms excessively, and as a result ductility and stretch flangeability decrease. The Mn content is therefore 4.0% or less, and preferably 3.5% or less.

P: 0.05% or Less

P is a harmful element that segregates to grain boundaries and decreases elongation to thus induce cracking during working and also cause a decrease in crashworthiness. The P content is therefore 0.05% or less, and preferably 0.01% or less. No lower limit is placed on the P content, and the P content may be 0% or more. However, excessive dephosphorization leads to increases in refining time and cost, etc., and accordingly the P content is preferably 0.002% or more.

S: 0.01% or Less

S exists in the steel as MnS and promotes void formation during punching, and also serves as an origin of void formation during working, thus decreasing stretch flangeability. Accordingly, the S content is preferably reduced as much as possible. The S content is 0.01% or less, and preferably 0.005% or less. No lower limit is placed on the S content, and the S content may be 0% or more. However, excessive desulfurization leads to increases in refining time and cost, etc., and accordingly the S content is preferably 0.0002% or more.

Al: 0.01% or More and 0.1% or Less

Al is an element that acts as a deoxidizer. To achieve the effect, the Al content needs to be 0.01% or more. The Al content is therefore 0.01% or more. If the Al content is excessive, Al remains in the steel sheet as Al oxide, and the Al oxide tends to coagulate and coarsen, which causes a decrease in local ductility. The Al content is therefore 0.1% or less.

N: 0.01% or Less

N exists in the steel as MN and promotes coarse void formation during punching, and also serves as an origin of coarse void formation during working, thus decreasing local ductility. Accordingly, the N content is preferably reduced as much as possible. The N content is 0.01% or less, and preferably 0.006% or less. No lower limit is placed on the N content, and the N content may be 0% or more. However, excessive denitrification leads to increases in refining time and cost, and accordingly the N content is preferably 0.0005% or more.

The high-strength cold-rolled steel sheet according to one of the disclosed embodiments can have a composition containing the above-described elements with the balance consisting of Fe and inevitable impurities.

7.5C+Mn: 5.0 or More

C and Mn are both an element that contributes to higher strength of the steel sheet. However, even in the case where the content of each of these elements is individually within the foregoing range, if 7.5C+Mn is less than 5.0, the desired steel sheet strength cannot be achieved. This is because C and Mn do not contribute to higher strength of the steel sheet independently of each other but influence each other and form tempered martensite and retained austenite, as a result of which the steel sheet strength increases. In particular, tempered martensite which significantly influences the steel sheet strength has varying contribution to the steel sheet strength depending on the fraction of tempered martensite, the C concentration, and the Mn concentration, which makes it difficult to control the steel sheet strength by only the microstructure proportion. However, if 7.5C+Mn is 5.0 or more, the desired steel sheet strength can be achieved. Accordingly, the C content and the Mn content need to satisfy the following formula (1). 7.5C+Mn is preferably 5.1 or more.

$$7.5C+Mn \leq 5.0 \qquad (1)$$

where C and Mn denote the contents of the respective elements (mass %).

In another one of the disclosed embodiments, the composition may optionally further contain at least one selected from the following elements.

Ti: 0.005% or More and 0.035% or Less

Ti forms carbonitride, and increases the strength of the steel by the action of strengthening by precipitation. To effectively exert the action, in the case of adding Ti, the Ti content is 0.005% or more. If the Ti content is excessive, precipitates form excessively, which may cause a decrease in ductility. The Ti content is therefore 0.035% or less, and preferably 0.020% or less.

Nb: 0.005% or More and 0.035% or Less

Nb forms carbonitride, and increases the strength of the steel by the action of strengthening by precipitation. To effectively exert the action, in the case of adding Nb, the Nb content is 0.005% or more. If the Nb content is excessive, precipitates form excessively, which may cause a decrease in ductility. The Nb content is therefore 0.035% or less, and preferably 0.030% or less.

V: 0.005% or More and 0.035% or Less

V forms carbonitride, and increases the strength of the steel by the action of strengthening by precipitation. To effectively exert the action, in the case of adding V, the V content is 0.005% or more. If the V content is excessive, precipitates form excessively, which may cause a decrease in ductility. The V content is therefore 0.035% or less, and preferably 0.030% or less.

Mo: 0.005% or More and 0.035% or Less

Mo forms carbonitride, and increases the strength of the steel by the action of strengthening by precipitation. To effectively exert the action, in the case of adding Mo, the Mo content is 0.005% or more. If the Mo content is excessive, precipitates form excessively, which may cause a decrease in ductility. The Mo content is therefore 0.035% or less, and preferably 0.030% or less.

B: 0.0003% or More and 0.01% or Less

B has an action of enhancing quench hardenability and facilitating the formation of tempered martensite, and thus is useful as a steel strengthening element. To effectively exert the action, in the case of adding B, the B content is 0.0003% or more. If the B content is excessive, tempered martensite forms excessively, which may cause a decrease in ductility. The B content is therefore 0.01% or less.

Cr: 0.05% or More and 1.0% or Less

Cr has an action of enhancing quench hardenability and facilitating the formation of tempered martensite, and thus is useful as a steel strengthening element. To effectively exert the action, in the case of adding Cr, the Cr content is 0.05% or more. If the Cr content is excessive, tempered martensite forms excessively, which may cause a decrease in ductility. The Cr content is therefore 1.0% or less.

Ni: 0.05% or More and 1.0% or Less

Ni has an action of enhancing quench hardenability and facilitating the formation of tempered martensite, and thus is useful as a steel strengthening element. To effectively exert the action, in the case of adding Ni, the Ni content is 0.05% or more. If the Ni content is excessive, tempered martensite forms excessively, which may cause a decrease in ductility. The Ni content is therefore 1.0% or less.

Cu: 0.05% or More and 1.0% or Less

Cu has an action of enhancing quench hardenability and facilitating the formation of tempered martensite, and thus is useful as a steel strengthening element. To effectively exert the action, in the case of adding Cu, the Cu content is 0.05% or more. If the Cu content is excessive, tempered martensite forms excessively, which may cause a decrease in ductility. The Cu content is therefore 1.0% or less.

Sb: 0.002% or More and 0.05% or Less

Sb has an action of suppressing the decarburization of the steel sheet surface layer (region of about several ten μm) caused by nitriding and oxidation of the steel sheet surface. Consequently, a decrease in the amount of austenite formed at the steel sheet surface can be prevented, and ductility can be further improved. To effectively exert the action, in the case of adding Sb, the Sb content is 0.002% or more. If the Sb content is excessive, toughness may decrease. The Sb content is therefore 0.05% or less.

Sn: 0.002% or More and 0.05% or Less

Sn has an action of suppressing the decarburization of the steel sheet surface layer (region of about several ten μm) caused by nitriding and oxidation of the steel sheet surface. Consequently, a decrease in the amount of austenite formed at the steel sheet surface can be prevented, and ductility can be further improved. To effectively exert the action, in the case of adding Sn, the Sn content is 0.002% or more. If the Sn content is excessive, toughness may decrease. The Sn content is therefore 0.05% or less.

Ca: 0.0005% or More and 0.005% or Less

Ca has an action of controlling the form of sulfide inclusions and is effective in suppressing a decrease in local ductility. To achieve the effect, in the case of adding Ca, the Ca content is preferably 0.0005% or more. If the Ca content is excessive, the effect may be saturated. The Ca content is therefore preferably 0.0005% or more and 0.005% or less.

Mg: 0.0005% or More and 0.005% or Less

Mg has an action of controlling the form of sulfide inclusions, and is effective in suppressing a decrease in local ductility. To achieve the effect, in the case of adding Mg, the Mg content is 0.0005% or more. If the Mg content is excessive, the effect may be saturated. The Mg content is therefore 0.005% or less.

REM: 0.0005% or More and 0.005% or Less

REM (rare earth metal) has an action of controlling the form of sulfide inclusions, and is effective in suppressing a decrease in local ductility. To achieve the effect, in the case of adding REM, the REM content is 0.0005% or more. If the REM content is excessive, the effect may be saturated. The REM content is therefore 0.005% or less.

In other words, the high-strength cold-rolled steel sheet according to one of the disclosed embodiments can have a composition that contains, in mass %, C: more than 0.18% and 0.45% or less,
Si: 0.5% or more and 2.5% or less,
Mn: more than 2.5% and 4.0% or less,
P: 0.05% or less,
S: 0.01% or less,
Al: 0.01% or more and 0.1% or less,
N: 0.01% or less, and
optionally at least one selected from the group consisting of
Ti: 0.005% or more and 0.035% or less,
Nb: 0.005% or more and 0.035% or less,
V: 0.005% or more and 0.035% or less,
Mo: 0.005% or more and 0.035% or less,
B: 0.0003% or more and 0.01% or less,
Cr: 0.05% or more and 1.0% or less,
Ni: 0.05% or more and 1.0% or less,
Cu: 0.05% or more and 1.0% or less,
Sb: 0.002% or more and 0.05% or less,
Sn: 0.002% or more and 0.05% or less,
Ca: 0.0005% or more and 0.005% or less,
Mg: 0.0005% or more and 0.005% or less, and
REM: 0.0005% or more and 0.005% or less,
with the balance consisting of Fe and inevitable impurities.

<Microstructure>

The microstructure of the high-strength cold-rolled steel sheet according to the present disclosure will be described below.

F+BF: 10% or More and 50% or Less

Ferrite (F) and bainitic ferrite (BF) are soft steel microstructures, and contribute to improved ductility of the steel sheet. Since carbon hardly dissolves in these microstructures, as a result of discharging C in austenite, the stability of austenite is increased, thus contributing to improved ductility. To impart necessary ductility to the steel sheet, the total area ratio of ferrite and bainitic ferrite needs to be 10% or more. The total area ratio of ferrite and bainitic ferrite is therefore 10% or more, preferably 12% or more, and more preferably 14% or more. If the total area ratio of ferrite and bainitic ferrite is more than 50%, it is difficult to ensure a tensile strength of 1320 MPa or more. The total area ratio of ferrite and bainitic ferrite is therefore 50% or less, and preferably 47% or less.

RA: More Than 15% and 50% or Less

Retained austenite (RA) is a microstructure having high ductility, and also undergoes strain-induced transformation to further contribute to improved ductility. To achieve the effects, the area ratio of retained austenite needs to be more than 15%. The area ratio of retained austenite is therefore more than 15%, and preferably 17% or more. If the area ratio of retained austenite is more than 50%, the stability of retained austenite decreases and strain-induced transformation occurs early, as a result of which ductility decreases. The area ratio of retained austenite is therefore 50% or less, preferably 45% or less, and more preferably 39% or less. Herein, the volume fraction of retained austenite is calculated by the below-described method and taken to be the area ratio.

TM: More than 15% and 60% or Less

Tempered martensite (TM) is a hard microstructure, and contributes to higher strength of the steel sheet. If the tempered martensite content is 15% or less in area ratio, the desired steel sheet strength cannot be achieved. The area ratio of tempered martensite is therefore more than 15%, preferably 20% or more, and more preferably 29% or more. If the area ratio of tempered martensite is more than 60%, the desired ductility and stretch flangeability cannot be ensured. The area ratio of tempered martensite is therefore 60% or less, preferably 55% or less, and more preferably 53% or less.

R1: 70% or More

Retained austenite improves the ductility of the steel sheet, but the contribution of retained austenite to improved ductility varies depending on the shape. Retained austenite with an aspect ratio of 0.6 or less is more stable in working and has a greater ductility improving effect than retained austenite with an aspect ratio of more than 0.6. Retained austenite with an aspect ratio of more than 0.6, which has low working stability, becomes hard martensite early during punching prior to a hole expanding test, and thus coarse voids tend to form around it. Particularly in the case where a lot of such retained austenite is exposed on the punched end surface, end surface cracking is induced. This causes hole expanding test failures, and increases the failure rate in the hole expanding test. On the other hand, retained austenite with an aspect ratio of 0.6 or less deforms along the flow of microstructure, and voids are unlikely to form around it. To ensure the desired ductility and sufficiently reduce the failure rate in the hole expanding test, the ratio (R1) of retained austenite with an aspect ratio of 0.6 or less to retained austenite is 70% or more, and preferably 75% or more. No upper limit is placed on R1, and the upper limit may be 100%. Herein, R1=((the area of retained austenite with an aspect ratio of 0.6 or less)/(the area of all retained austenite))×100(%).

R2: 50% or More

Even in the case where retained austenite with an aspect ratio of more than 0.6 exists, if retained austenite with an aspect ratio of 0.6 or less exists in ferrite grain boundaries with an orientation difference of 40° or more, punched end surface cracking caused by retained austenite with an aspect ratio of more than 0.6 is suppressed, and the failure rate in the hole expanding test is reduced considerably. Although the reason for this is not clear, we consider the reason as follows: As a result of retained austenite with an aspect ratio of 0.6 or less existing so as to cover ferrite grain boundaries with an orientation difference of 40° or more where the orientation difference is large and stress tends to concentrate, stress concentrated due to deformation of retained austenite and deformation-induced martensite transformation can be relaxed. Consequently, stress concentration around retained austenite with an aspect ratio of more than 0.6 existing in the vicinity is reduced, and the formation of voids and cracks is suppressed. To sufficiently reduce the failure rate in the hole expanding test, the ratio (R2) of retained austenite with an aspect ratio of 0.6 or less existing in ferrite grain boundaries with an orientation difference of 40° or more to retained austenite with an aspect ratio of 0.6 or less is 50% or more, and preferably 65% or more. No upper limit is placed on R2, and the upper limit may be 100%. Herein, R2=((the area of retained austenite with an aspect ratio of 0.6 or less existing in ferrite grain boundaries with an orientation difference of 40° or more)/(the area of retained austenite with an aspect ratio of 0.6 or less))×100(%).

Average KAM Value of bcc Phase: 1° or Less

Even in the case where retained austenite with an aspect ratio of more than 0.6 exists, if the average KAM value of bcc phase is 1° or less, punched end surface cracking caused by retained austenite with an aspect ratio of more than 0.6 is suppressed, and the failure rate in the hole expanding test is reduced. Although the reason for this is not clear, we consider the reason as follows: Since bcc phase having a low KAM value has low GN dislocation density and accordingly deforms easily, stress concentration around retained austenite with an aspect ratio of more than 0.6 is reduced in punching, and the formation of voids and cracks is suppressed. To sufficiently reduce the failure rate in the hole expanding test, the average KAM value of bcc phase is 1° or less, and preferably 0.8° or less. No lower limit is placed on the average KAM value of bcc phase, and the lower limit may be 0°.

<Tensile Strength>

The high-strength cold-rolled steel sheet according to the present disclosure has excellent strength, i.e. a tensile strength of 1320 MPa or more, as described above. No upper limit is placed on the tensile strength, and the tensile strength may be 1800 MPa or less, and may be 1750 MPa or less.

<Coated or Plated Layer>

The high-strength cold-rolled steel sheet according to the present disclosure may further have a coated or plated layer at its surface, in terms of improving corrosion resistance and the like. The coated or plated layer is not limited, and any coated or plated layer may be used. For example, the coated or plated layer is preferably a zinc coated layer or a zinc alloy coated layer. The zinc alloy coated layer is preferably a zinc-based alloy coated layer. The method of forming the coated or plated layer is not limited, and any method may be used. For example, the coated or plated layer may be at least one selected from the group consisting of a hot-dip coated layer, an alloyed hot-dip coated layer, and an electroplated layer. The zinc alloy coated layer may be, for example, a zinc alloy coated layer containing at least one selected from the group consisting of Fe, Cr, Al, Ni, Mn, Co, Sn, Pb, and Mo with the balance consisting of Zn and inevitable impurities.

The high-strength cold-rolled steel sheet may have the coated or plated layer on one or both sides.

[Method for Manufacturing High-Strength Cold-Rolled Steel Sheet]

A method for manufacturing the high-strength cold-rolled steel sheet according to the present disclosure will be described below.

The high-strength cold-rolled steel sheet according to the present disclosure can be manufactured by subjecting a steel material having the foregoing composition to hot rolling, pickling, cold rolling, and annealing in sequence. The annealing includes three steps. By controlling the conditions in each annealing step, a high-strength cold-rolled steel sheet having the microstructure described above can be obtained.

<Steel Material>

The steel material having the foregoing composition is used as the starting material. The method of producing the steel material is not limited, and any method may be used. For example, the steel material may be produced by a known smelting method using a converter or an electric heating furnace. The shape of the steel material is not limited but is preferably a slab. It is preferable to produce the slab (steel slab) as the steel material by continuous casting after smelting, in terms of productivity and the like. The steel slab may be produced by a known casting method such as ingot casting-blooming or thin slab continuous casting.

<Hot Rolling>

The hot rolling is a process of hot rolling the steel material having the foregoing composition to obtain a hot-rolled steel sheet. In the hot rolling, the steel material having the foregoing composition is heated and hot-rolled. In the present disclosure, the microstructure is controlled by the below-described annealing, and accordingly the hot rolling is not limited and may be performed under any conditions. For example, commonly used hot rolling conditions may be used.

For example, the steel material is heated to a heating temperature of 1100° C. or more and 1300° C. or less, and the heated steel material is hot-rolled. The finisher delivery temperature in the hot rolling may be, for example, 850° C. or more and 950° C. or less. After the hot rolling ends, the steel material is cooled under any conditions. For example, the steel material is preferably cooled at an average cooling rate of 20° C./sec or more and 100° C./sec or less in a temperature range of 450° C. or more and 950° C. or less. After the cooling, for example, the steel material is coiled at a coiling temperature of 400° C. or more and 700° C. or less, to obtain the hot-rolled steel sheet. These conditions are merely examples, and are not essential for the present disclosure.

<Pickling>

The pickling is a process of pickling the hot-rolled steel sheet obtained as a result of the hot rolling. The pickling is not limited, and may be performed under any conditions. For example, commonly used pickling with hydrochloric acid, sulfuric acid, or the like may be used.

<Cold Rolling>

The cold rolling is a process of cold rolling the hot-rolled steel sheet after the pickling. In more detail, in the cold rolling, the hot-rolled steel sheet that has been pickled is cold rolled at a rolling reduction of 30% or more.

<<Rolling Reduction in Cold Rolling: 30% or More>>

The rolling reduction in the cold rolling is 30% or more. If the rolling reduction is less than 30%, the working amount is insufficient, and austenite nucleation sites decrease. Consequently, the austenite microstructure becomes coarse and non-uniform in the subsequent first annealing. Lower bainite transformation in the holding process in the first annealing is suppressed, and martensite forms excessively. This makes it impossible to obtain a microstructure mainly composed of lower bainite as the steel sheet microstructure after the first annealing. Martensite portions after the first annealing tend to form retained austenite with an aspect ratio of more than 0.6 in the subsequent second annealing. While the upper limit of the rolling reduction is determined based on the ability of the cold mill, an excessively high rolling reduction can increase the rolling load and decrease productivity. Accordingly, the rolling reduction is preferably 70% or less. The number of rolling passes and the rolling reduction in each rolling pass are not limited.

<Annealing>

The annealing is a process of annealing the cold-rolled steel sheet obtained as a result of the cold rolling. In more detail, the annealing includes the below-described first annealing, second annealing, and third annealing.

<<First Annealing>>

The first annealing is a process of heating the cold-rolled steel sheet obtained as a result of the cold rolling at an annealing temperature $T_1$ of $Ac_3$ point or more and 950° C. or less, cooling the cold-rolled steel sheet from the annealing temperature $T_1$ to a cooling stop temperature $T_2$ of 250° C. or more and less than 350° C. at an average cooling rate of more than 10° C./sec, and holding the cold-rolled steel sheet at the cooling stop temperature $T_2$ for 10 sec or more, to obtain a first cold-rolled and annealed sheet. The purpose of this process is to cause the steel sheet microstructure at the completion of the first annealing to be a microstructure mainly composed of lower bainite. In particular, martensite portions after the first annealing tend to form retained austenite with an aspect ratio of more than 0.6 in the subsequent second annealing. Hence, in the case where martensite forms excessively in the first annealing, it is difficult to obtain the desired steel sheet microstructure. By limiting the manufacturing conditions to the foregoing ranges, the steel sheet whose microstructure is mainly composed of lower bainite is obtained, with it being possible to obtain the desired steel sheet microstructure after the second annealing.

($Ac_3$ Point)

$Ac_3$ point (° C.) can be calculated according to the following Andrews' formula.

$$Ac_3=910-203[C]^{1/2}+45[Si]-30[Mn]-20[Cu]-15[Ni]+11[Cr]+32[Mo]+104[V]+400[Ti]+460[Al].$$

Each bracketed symbol in the formula represents the content of the element in the brackets in the steel sheet (mass %). In the case where the element is not contained, the content is taken to be 0.

(Annealing temperature $T_1$: $Ac_3$ Point or More and 950° C. or Less)

If the annealing temperature $T_1$ is less than $Ac_3$ point, ferrite remains during the annealing, and, in the subsequent cooling, ferrite grows from such ferrite remaining during the annealing as a nucleus. C is thus distributed in austenite. Consequently, lower bainite transformation is suppressed in the subsequent holding, and martensite forms excessively. This makes it impossible to obtain a microstructure mainly composed of lower bainite as the steel sheet microstructure after the first annealing. The annealing temperature $T_1$ is therefore $Ac_3$ point or more. If the annealing temperature $T_1$ is more than 950° C., austenite grains coarsen excessively. Consequently, the formation of lower bainite in the holding after the cooling is suppressed, and martensite forms excessively. This makes it impossible to obtain a microstructure mainly composed of lower bainite as the steel sheet microstructure after the first annealing. Martensite portions after the first annealing tend to form retained austenite with an aspect ratio of more than 0.6 in the subsequent second annealing. The annealing temperature $T_1$ is therefore 950° C. or less, and preferably 900° C. or less. The holding time at the annealing temperature $T_1$ is not limited, and may be, for example, 10 sec or more and 1000 sec or less.

(Average Cooling Rate from Annealing Temperature $T_1$ to Cooling Stop Temperature $T_2$: More than 10° C./Sec)

If the average cooling rate from the annealing temperature $T_1$ to the cooling stop temperature $T_2$ is 10° C./sec or less, ferrite forms during the cooling. C is thus distributed in austenite. Consequently, lower bainite transformation is suppressed in the subsequent holding, and martensite forms excessively. This makes it impossible to obtain a microstructure mainly composed of lower bainite as the steel sheet microstructure after the first annealing. Martensite portions after the first annealing tend to form retained austenite with an aspect ratio of more than 0.6 in the subsequent second annealing. The average cooling rate from the annealing temperature $T_1$ to the cooling stop temperature $T_2$ is therefore more than 10° C./sec, and preferably 15° C./sec or more. No upper limit is placed on the average cooling rate, but the average cooling rate is preferably 50° C./sec or less in terms of production technology, plant investment, etc., given that an excessively large cooling device is required to ensure an excessively high cooling rate. The cooling may be performed by any method. As the cooling method, at least one selected from the group consisting of gas cooling, furnace cooling, and mist cooling is preferable, and gas cooling is particularly preferable.

(Cooling Stop Temperature $T_2$: 250° C. or More and Less than 350° C.)

If the cooling stop temperature $T_2$ is less than 250° C., martensite forms excessively in the steel sheet microstructure. Martensite portions after the first annealing tend to form retained austenite with an aspect ratio of more than 0.6 in the subsequent second annealing. The cooling stop temperature $T_2$ is therefore 250° C. or more, and preferably 270° C. or more. If the cooling stop temperature $T_2$ is 350° C. or more, upper bainite is formed instead of lower bainite. Since upper bainite has a much coarser microstructure size than lower bainite, upper bainite forms a lot of retained austenite with an aspect ratio of 0.6 or less inside ferrite grains with an orientation difference of 40° or more after the subsequent second annealing, and thus the desired steel sheet microstructure after the second annealing cannot be obtained. The cooling stop temperature $T_2$ is therefore less than 350° C., and preferably 340° C. or less.

(Holding Time at Cooling Stop Temperature $T_2$: 10 Sec or More)

If the holding time at the cooling stop temperature $T_2$ is less than 10 sec, lower bainite transformation does not complete adequately. Consequently, martensite forms excessively, and the desired microstructure cannot be obtained in the subsequent second annealing. Martensite portions after the first annealing tend to form retained austenite with an aspect ratio of more than 0.6 in the subsequent second annealing. The holding time at the cooling stop temperature $T_2$ is therefore 10 sec or more, preferably 20 sec or more, and more preferably 30 sec or more. No upper limit is placed on the holding time at the cooling stop temperature $T_2$, but the holding time is preferably 1800 sec or less, because holding for an excessively long time requires a long and large production line and results in a significant decrease in steel sheet productivity. After the holding at the cooling stop temperature $T_2$, for example, the steel sheet may be cooled to the room temperature until the subsequent second annealing, or subjected to the second annealing without cooling.

<<Second Annealing>>

The second annealing is a process of heating (reheating) the first cold-rolled and annealed sheet obtained as a result of the first annealing at an annealing temperature $T_3$ of 680° C. or more and 820° C. or less and cooling the first cold-rolled and annealed sheet from the annealing temperature $T_3$ to a cooling stop temperature $T_4$ of 300° C. or more and 500° C. or less, to obtain a second cold-rolled and annealed sheet.

(Annealing Temperature $T_3$: 680° C. or More and 820° C. or Less)

If the annealing temperature $T_3$ is less than 680° C., a sufficient amount of austenite does not form in the annealing, so that the desired amount of retained austenite cannot be secured in the steel sheet microstructure after the second annealing, and ferrite becomes excessive. The annealing temperature $T_3$ is therefore 680° C. or more, and preferably 700° C. or more. If the annealing temperature $T_3$ is more than 820° C., austenite forms excessively, and the effect of microstructure control before the second annealing is initialized. This makes it difficult to achieve the desired ratio of retained austenite with an aspect ratio of 0.6 or less and the desired ratio of retained austenite with an aspect ratio of 0.6 or less existing in ferrite grain boundaries with an orientation difference of 40° or more to retained austenite with an aspect ratio of 0.6 or less. The annealing temperature $T_3$ is therefore 820° C. or less, and preferably 800° C. or less. The holding time at the annealing temperature $T_3$ is not limited, and may be, for example, 10 sec or more and 1000 sec or less. The average cooling rate from the annealing temperature $T_3$ to the cooling stop temperature $T_4$ is not limited, and may be, for example, 5° C./sec or more and 50° C./sec or less.

(Cooling Stop Temperature $T_4$: 300° C. or More and 550° C. or Less)

If the cooling stop temperature $T_4$ is less than 300° C., the concentration of C in austenite is insufficient. Hence, the amount of retained austenite decreases, and a large amount of tempered martensite forms, so that the desired steel sheet microstructure cannot be obtained. The cooling stop temperature $T_4$ is therefore 300° C. or more. If the cooling stop temperature $T_4$ is more than 550° C., pearlite forms from austenite. Hence, the amount of retained austenite decreases, and the desired steel sheet microstructure cannot be obtained. The cooling stop temperature $T_4$ is therefore 550° C. or less.

(Holding Time at Cooling Stop Temperature $T_4$: 10 Sec or More)

If the holding time at the cooling stop temperature $T_4$ is less than 10 sec, the concentration of C in austenite is insufficient. Hence, the amount of retained austenite decreases, and a large amount of tempered martensite forms, so that the desired steel sheet microstructure cannot be obtained. The holding time at the cooling stop temperature $T_4$ is therefore 10 sec or more, preferably 20 sec or more, and more preferably 40 sec or more. No upper limit is placed on the holding time at the cooling stop temperature $T_4$, and the holding time may be, for example, 1800 sec or less.

(Cooling to Room Temperature)

After the holding at the cooling stop temperature $T_4$, the first cold-rolled and annealed sheet is cooled to the room temperature. By cooling the first cold-rolled and annealed sheet to the room temperature, part of austenite transforms into martensite, and strain associated with such transformation causes the KAM value of bcc phase (martensite itself and adjacent ferrite, bainitic ferrite, etc.) to increase. The increased KAM value can be decreased by the below-described third annealing. In the case where the below-described third annealing is performed without cooling the first cold-rolled and annealed sheet to the room temperature, part of austenite transforms into martensite after the completion of the third annealing, as a result of which the KAM value of bcc phase of the final microstructure increases and the desired steel sheet microstructure cannot be obtained. The cooling is not limited, and may be performed by any method such as allowing the steel sheet to naturally cool.

<<Third Annealing>>

The third annealing is a process of heating (reheating) the second cold-rolled and annealed sheet obtained as a result of the second annealing at an annealing temperature $T_5$ of 100° C. or more and 550° C. or less to obtain a third cold-rolled and annealed sheet.

(Annealing Temperature $T_5$: 100° C. or More and 550° C. or Less)

If the annealing temperature $T_5$ is more than 550° C., pearlite forms from austenite. Hence, the amount of retained austenite decreases, and the desired steel sheet microstructure cannot be obtained. The annealing temperature $T_5$ is therefore 550° C. or less, preferably 520° C. or less, and more preferably less than 450° C. If the annealing temperature $T_5$ is less than 100° C., the effect of tempering is insufficient, and the average KAM value of bcc phase cannot be limited to 1° or less, so that the desired steel sheet microstructure cannot be obtained. The annealing temperature $T_5$ is therefore 100° C. or more, and preferably 130° C. or more.

The holding time at the annealing temperature $T_5$ is not limited, and may be, for example, 10 sec or more and 86400 sec or less. In the case where the below-described coating or plating is not performed, the third cold-rolled and annealed sheet obtained as a result of the third annealing is the high-strength cold-rolled steel sheet according to the present disclosure.

<Coating or Plating>

The method for manufacturing the high-strength cold-rolled steel sheet according to one of the disclosed embodiments may further include coating or plating, i.e. a process of subjecting the second cold-rolled and annealed sheet or the third cold-rolled and annealed sheet to a coating or plating treatment. That is, the second cold-rolled and annealed sheet may be subjected to the coating or plating treatment to form a coated or plated layer at its surface, at any point during the second annealing or after the completion of the second annealing as long as it is after the cooling to the cooling stop temperature $T_4$ in the second annealing. In this case, the third cold-rolled and annealed sheet obtained as a result of the third annealing being performed on the second cold-rolled and annealed sheet having the coated or plated layer formed at its surface is the high-strength cold-rolled steel sheet according to the present disclosure. Alternatively, the third cold-rolled and annealed sheet obtained as a result of the third annealing may be further subjected to the coating or plating treatment to form a coated or plated layer at its surface. In this case, the third cold-rolled and annealed sheet having the coated or plated layer formed at its surface is the high-strength cold-rolled steel sheet according to the present disclosure.

The coating or plating treatment is not limited, and may be performed by any method. For example, in the coating or plating, at least one selected from the group consisting of hot dip coating, alloyed hot dip coating, and electroplating may be used. For example, the coated or plated layer formed in the coating or plating is preferably a zinc coated layer or a zinc alloy coated layer. The zinc alloy coated layer is preferably a zinc-based alloy coated layer. The zinc alloy coated layer may be, for example, a zinc alloy coated layer containing at least one alloying element selected from the group consisting of Fe, Cr, Al, Ni, Mn, Co, Sn, Pb, and Mo with the balance consisting of Zn and inevitable impurities.

Before the coating or plating treatment, a pretreatment such as degreasing and phosphate treatment may be optionally performed. For example, hot-dip galvanizing treatment is preferably a treatment of, using a commonly used continuous hot-dip galvanizing line, immersing the second cold-rolled and annealed sheet in a hot-dip galvanizing bath to form a hot-dip galvanized layer of a predetermined weight at its surface. When immersing the second cold-rolled and annealed sheet in the hot-dip galvanizing bath, it is preferable to adjust, by reheating or cooling, the temperature of the second cold-rolled and annealed sheet to not less than the hot-dip galvanizing bath temperature −50° C. and not more than the hot-dip galvanizing bath temperature +60° C. The temperature of the hot-dip galvanizing bath is preferably 440° C. or more and 500° C. or less. The hot-dip galvanizing bath may contain not only Zn but also the foregoing alloying element(s).

The coating weight of the coated or plated layer is not limited, and may be any value. For example, the coating weight of the coated or plated layer is preferably 10 g/m² or more per one side. The coating weight is preferably 100 g/m² or less per one side.

For example, in the case of forming the coated or plated layer by hot dip coating, the coating weight of the coated or plated layer can be controlled by a means such as gas wiping. The coating weight of the hot-dip coated layer is more preferably 30 g/m² or more per one side. The coating weight of the hot-dip coated layer is more preferably 70 g/m² or less per one side.

The coated or plated layer (hot-dip coated layer) formed by the hot dip coating treatment may be optionally subjected to an alloying treatment to form an alloyed hot-dip coated layer. The temperature of the alloying treatment is not limited, but is preferably 460° C. or more and 600° C. or less. In the case of using a galvannealed layer as the coated or plated layer, a hot-dip galvanizing bath containing Al: 0.10 mass % or more and 0.22 mass % or less is preferably used, in terms of improving the appearance of the coated or plated layer.

In the case of forming the coated or plated layer by electroplating, for example, the coating weight of the coated or plated layer can be controlled by adjusting the sheet passing speed and/or the current value. The coating weight of the electroplated layer is more preferably 20 g/m² or more per one side. The coating weight of the electroplated layer is more preferably 40 g/m² or less per one side.

EXAMPLES

The presently disclosed techniques will be described in detail below by way of examples, although the present disclosure is not limited to such.

<Manufacture of Cold-Rolled Steel Sheet>

Molten steels of the compositions listed in Table 1 were each obtained by steelmaking by a commonly known technique, and continuously cast to form a slab (steel material) having a thickness of 300 mm. The obtained slab was hot-rolled to obtain a hot-rolled steel sheet. The obtained hot-rolled steel sheet was pickled by a commonly known technique, and then cold-rolled at the rolling reduction listed in Tables 2 and 3, to obtain a cold-rolled steel sheet (sheet thickness: 1.4 mm).

The obtained cold-rolled steel sheet was subjected to annealing under the conditions listed in Tables 2 and 3, to obtain a third cold-rolled and annealed sheet. The annealing was performed in three stages, namely, the first annealing, the second annealing, and the third annealing. In the first annealing, the holding time at the annealing temperature $T_1$ was 100 sec. In the second annealing, the holding time at the annealing temperature $T_3$ was 100 sec, and the average cooling rate from the annealing temperature $T_3$ to the cooling stop temperature $T_4$ was 20° C./sec. In the third annealing, the holding time at the annealing temperature $T_5$ was 21600 sec.

For some second cold-rolled and annealed sheets, after the cooling to the cooling stop temperature $T_4$, a hot-dip galvanizing treatment was further performed to form a hot-dip galvanized layer at its surface, thus obtaining a hot-dip galvanized steel sheet. In the hot-dip galvanizing treatment, using a continuous hot-dip galvanizing line, the steel sheet after the cooling to the cooling stop temperature $T_4$ was optionally reheated to a temperature of 430° C. or more and 480° C. or less, and then immersed in a hot-dip galvanizing bath (bath temperature: 470° C.) so that the coating weight of the coated or plated layer was 45 g/m² per one side. The bath composition was Zn-0.18 mass % Al.

Here, for some hot-dip galvanized steel sheets, a bath composition of Zn-0.14 mass % Al was used, and, after the coating or plating treatment, an alloying treatment was performed at 520° C. to form a galvannealed steel sheet. The Fe concentration in the coated or plated layer was 9 mass % or more and 12 mass % or less. For some other third cold-rolled and annealed sheets, after the end of the annealing, an electrogalvanizing treatment was performed using an electrogalvanizing line so that the coating weight was 30 g/m² per one side, to form an electrogalvanized steel sheet.

In Tables 4 and 5, the types of the eventually obtained cold-rolled steel sheets are indicated using the following symbols:

CR: cold-rolled steel sheet having no coated or plated layer
GI: hot-dip galvanized steel sheet
GA: galvannealed steel sheet
EG: electrogalvanized steel sheet.

<Evaluation>

Test pieces were collected from the obtained cold-rolled steel sheets, and microstructure observation, retained austenite fraction measurement, a tensile test, and a hole expanding test were conducted. The results are listed in Tables 4 and 5. The test methods are as follows.

<<Microstructure Observation>>

First, a test piece for microstructure observation was collected from each cold-rolled steel sheet. The collected test piece was then polished so that the observation plane was at the position corresponding to ¼ of the sheet thickness in a cross section along the rolling direction (L-cross section). After etching (1 vol % nital etching) the observation plane, the observation plane was observed for 10 observation fields using a scanning electron microscope (SEM, magnification: 3000 times), and SEM images were taken. Using the obtained SEM images, the area ratio of each microstructure was determined by image analysis. As the area ratio, the average value for 10 observation fields was used. In SEM images, ferrite and bainitic ferrite are gray, martensite and retained austenite are white, and substructure is revealed in tempered martensite. Accordingly, each microstructure was determined based on the tone of color and whether substructure is present. While ferrite and bainitic ferrite are not easily distinguishable from each other, the sum total of these microstructures is important here, and thus the total area ratio of ferrite and bainitic ferrite and the area ratio of tempered martensite were determined without distinguishing the microstructures.

Further, each test piece was polished by colloidal silica vibrational polishing so that the observation plane was at the position corresponding to ¼ of the sheet thickness in a cross section along the rolling direction (L-cross section). The observation plane was mirror finished. Next, after removing working transformation phase of the observation plane caused by polishing strain using ultra-low acceleration ion milling, electron backscatter diffraction (EBSD) measurement was performed, and local crystal orientation data was obtained. In the measurement, the SEM magnification was 1500 times, the step size was 0.04 µm, the measurement region was 40 sq. µm, and the WD was 15 mm. The obtained local orientation data was analyzed using analytical software OIM Analysis 7. The analysis was performed for three observation fields, and the average value was used.

Prior to the data analysis, clean-up processes by the grain dilation function (grain tolerance angle: 5, minimum grain size: 5, single iteration: ON), and the grain CI standardization function (grain tolerance angle: 5, minimum grain size: 5) of the analytical software were sequentially performed once. After this, only the measurement points of CI value >0.1 were used in the analysis.

For data of fcc phase, analysis was performed using "Grain Shape Aspect Ratio" chart with "Aspect Ratio". The ratio (R1) of retained austenite with an aspect ratio of 0.6 or less to retained austenite was calculated. In the foregoing analysis, Method 2 was used as the grain shape calculation method.

For data of bcc phase, after displaying ferrite grain boundaries with an orientation difference of 40° or more (boundaries between bcc phase with an orientation difference of 40° or more), the ratio (R2) of retained austenite with an aspect ratio of 0.6 or less existing in ferrite grain boundaries with an orientation difference of 40° or more (including prior austenite grain boundaries) to the above-calculated retained austenite with an aspect ratio of 0.6 or less was calculated.

Further, for data of bcc phase, a KAM value chart was displayed, and the average KAM value of bcc phase was calculated. This analysis was performed under the following conditions:

Nearest neighbor: 1st
Maximum misorientation: 5
Perimeter only
Set 0-point kernels to maximum misorientation: checked.

<<Retained Austenite Fraction Measurement>>

A test piece for X-ray diffraction was collected from each cold-rolled steel sheet, and ground and polished so that the measurement plane was at the position corresponding to ¼ of the sheet thickness. The volume fraction of retained austenite was determined from the intensity of diffracted X rays by an X-ray diffraction method. CoKα rays were used as incident X rays. In the calculation of the volume fraction of retained austenite, the intensity ratio was calculated for all combinations of the peak integrated intensities of {111}, {200}, {220}, and {311} planes of fcc phase (retained austenite) and {110}, {200}, and {211} planes of bcc phase, and the average value of the intensity ratios was yielded to calculate the volume fraction of retained austenite. The volume fraction of austenite determined by X-ray diffraction was treated as being equal to the area ratio, and the volume fraction of austenite thus obtained was taken to be the area ratio.

<<Tensile Test>>

A JIS No. 5 tensile test piece (JIS Z 2241: 2001) was collected from each cold-rolled steel sheet so that the direction (C direction) orthogonal to the rolling direction was the tensile direction, and subjected to a tensile test in accordance with JIS Z 2241: 2001 to measure tensile strength (TS) and elongation (El).

(Strength)

The strength was evaluated as high in the case where TS was 1320 MPa or more.

(Ductility)

The ductility was evaluated as high (favorable) in the case where El satisfied any of the following.

El: 15% or more when TS was 1320 MPa or more and less than 1460 MPa.

El: 13% or more when TS was 1470 MPa or more.

<<Hole Expanding Test>>

A test piece (size: 100 mm×100 mm) was collected from each cold-rolled steel sheet, and a hole of 10 mmϕ) in initial diameter $d_0$ was punched in the test piece (clearance: 12.5% of the test piece sheet thickness). A hole expanding test was conducted using the resultant test piece. In detail, a conical punch with a vertex angle of 60° was inserted into the hole of 10 mmϕ in initial diameter $d_0$ from the punch side at the time of punching, to expand the hole. The diameter d (mm) of the hole when a crack ran through the steel sheet (test piece) was measured, and the hole expansion ratio λ (%) was calculated according to the following formula.

$$\text{Hole expansion ratio } \lambda = \{(d-d_0)/d_0\} \times 100.$$

The hole expanding test was performed 100 times for each steel sheet, and the average value was taken to be the average hole expansion ratio λ (%). The average hole expansion ratio λ is hereafter also referred to as "average λ". Moreover, the probability of the value of the hole expansion ratio λ being not greater than half of the average hole expansion ratio λ was calculated, and taken to be the failure rate in the hole expanding test (%).

(Stretch Flangeability)

The stretch flangeability was evaluated as favorable in the following cases.

Average λ: 10% or more when TS was 1320 MPa or more and less than 1470 MPa.

Average λ: 8% or more when TS was 1470 MPa or more.

(Failure Rate in Hole Expanding Test)

The failure rate in the hole expanding test was evaluated as low in the case where the failure rate in the hole expanding test was 4% or less.

TABLE 1

| Steel sample ID | Chemical composition [mass %] * | | | | | | | | 7.5 C + Mn [mass %] | $Ac_3$ point [° C.] | Remarks |
|---|---|---|---|---|---|---|---|---|---|---|---|
| | C | Si | Mn | P | S | N | Al | Others | | | |
| A | 0.33 | 1.90 | 3.11 | 0.009 | 0.0035 | 0.0040 | 0.041 | — | 5.6 | 804 | Conforming steel |
| B | 0.36 | 1.72 | 2.76 | 0.017 | 0.0027 | 0.0034 | 0.027 | — | 5.5 | 795 | Conforming steel |
| C | 0.32 | 1.71 | 3.01 | 0.008 | 0.0031 | 0.0021 | 0.035 | — | 5.4 | 797 | Conforming steel |
| D | 0.33 | 1.24 | 2.77 | 0.010 | 0.0033 | 0.0049 | 0.032 | — | 5.3 | 780 | Conforming steel |
| E | 0.43 | 1.20 | 3.26 | 0.004 | 0.0022 | 0.0025 | 0.017 | Ti: 0.03 | 6.5 | 753 | Conforming steel |
| F | 0.36 | 1.54 | 2.75 | 0.019 | 0.0037 | 0.0032 | 0.043 | Nb: 0.02 | 5.4 | 795 | Conforming steel |
| G | 0.35 | 2.45 | 3.06 | 0.010 | 0.0037 | 0.0023 | 0.028 | V: 0.03 | 5.7 | 825 | Conforming steel |
| H | 0.24 | 0.52 | 3.33 | 0.018 | 0.0031 | 0.0043 | 0.042 | Mo: 0.03 | 5.1 | 755 | Conforming steel |
| I | 0.44 | 1.36 | 3.95 | 0.006 | 0.0027 | 0.0040 | 0.055 | B: 0.0030 | 7.3 | 743 | Conforming steel |
| J | 0.40 | 1.91 | 2.56 | 0.006 | 0.0033 | 0.0043 | 0.041 | Cr: 0.7 | 5.6 | 817 | Conforming steel |
| K | 0.31 | 2.22 | 3.42 | 0.007 | 0.0006 | 0.0049 | 0.048 | Ni: 0.4 | 5.8 | 810 | Conforming steel |
| L | 0.35 | 1.45 | 2.71 | 0.007 | 0.0097 | 0.0039 | 0.037 | Cu: 0.3 | 5.3 | 785 | Conforming steel |
| M | 0.27 | 1.10 | 3.11 | 0.043 | 0.0005 | 0.0044 | 0.046 | Sb: 0.021 | 5.1 | 782 | Conforming steel |
| N | 0.19 | 1.75 | 3.55 | 0.010 | 0.0037 | 0.0032 | 0.042 | Sn: 0.015 | 5.0 | 813 | Conforming steel |
| O | 0.30 | 1.84 | 3.34 | 0.017 | 0.0006 | 0.0090 | 0.034 | Ca: 0.0036 | 5.6 | 797 | Conforming steel |
| P | 0.26 | 1.66 | 3.54 | 0.019 | 0.0038 | 0.0031 | 0.093 | Mg: 0.0021 | 5.5 | 817 | Conforming steel |
| Q | 0.27 | 1.67 | 3.49 | 0.020 | 0.0010 | 0.0036 | 0.012 | REM: 0.004 | 5.5 | 781 | Conforming steel |
| R | 0.16 | 2.22 | 2.71 | 0.010 | 0.0038 | 0.0039 | 0.046 | — | 3.9 | 869 | Comparative steel |
| S | 0.49 | 2.04 | 3.29 | 0.006 | 0.0011 | 0.0032 | 0.026 | — | 7.0 | 773 | Comparative steel |
| T | 0.26 | 0.21 | 3.33 | 0.010 | 0.0013 | 0.0020 | 0.029 | — | 5.3 | 729 | Comparative steel |
| U | 0.38 | 2.74 | 2.91 | 0.012 | 0.0036 | 0.0031 | 0.023 | — | 5.8 | 831 | Comparative steel |
| V | 0.45 | 2.06 | 2.36 | 0.011 | 0.0025 | 0.0030 | 0.028 | — | 5.7 | 809 | Comparative steel |
| W | 0.28 | 1.00 | 4.21 | 0.020 | 0.0018 | 0.0039 | 0.036 | — | 6.3 | 737 | Comparative steel |
| X | 0.22 | 1.76 | 3.18 | 0.007 | 0.0015 | 0.0026 | 0.025 | — | 4.8 | 809 | Comparative steel |

* Balance consisting of Fe and inevitable impurities

TABLE 2

| | | | First annealing | | | | Second annealing | | | | Third | |
|---|---|---|---|---|---|---|---|---|---|---|---|---|
| No. | Steel sample ID | Cold rolling Rolling reduction | Annealing temperature $T_1$ [° C.] | Average cooling rate from $T_1$ to $T_2$ [° C./s] | Cooling stop temperature $T_2$ [° C.] | Holding time [s] | Annealing temperature $T_3$ [° C.] | Cooling stop temperature $T_4$ [° C.] | Holding time [s] | Cooling to room temperature | annealing Annealing temperature $T_5$ [° C.] | Remarks |
| 1 | A | 55 | 820 | 15 | 280 | 310 | 750 | 470 | 80 | Performed | 140 | Example |
| 2 | B | 40 | 830 | 25 | 290 | 150 | 760 | 390 | 180 | Performed | 180 | Example |
| 3 | C | 65 | 870 | 40 | 330 | 290 | 730 | 520 | 200 | Performed | 210 | Example |

TABLE 2-continued

| | | | First annealing | | | | Second annealing | | | | Third | |
| | Steel sample ID | Cold rolling Rolling re- duction | Annealing temperature $T_1$ [°C.] | Average cooling rate from $T_1$ to $T_2$ [°C./s] | Cooling stop temperature $T_2$ [°C.] | Holding time [s] | Annealing temperature $T_3$ [°C.] | Cooling stop temperature $T_4$ [°C.] | Holding time [s] | Cooling to room temperature | annealing Annealing temperature $T_5$ [°C.] | Remarks |
| No. | | | | | | | | | | | | |
|---|---|---|---|---|---|---|---|---|---|---|---|---|
| 4 | D | 45 | 860 | 40 | 340 | 50 | 730 | 320 | 140 | Performed | 170 | Example |
| 5 | E | 55 | 830 | 30 | 300 | 400 | 710 | 470 | 260 | Performed | 370 | Example |
| 6 | F | 70 | 810 | 20 | 280 | 120 | 720 | 350 | 510 | Performed | 360 | Example |
| 7 | G | 55 | 900 | 35 | 330 | 80 | 770 | 370 | 450 | Performed | 290 | Example |
| 8 | H | 65 | 830 | 30 | 310 | 160 | 700 | 500 | 60 | Performed | 150 | Example |
| 9 | I | 50 | 810 | 40 | 340 | 100 | 700 | 350 | 310 | Performed | 410 | Example |
| 10 | J | 30 | 850 | 15 | 270 | 330 | 780 | 420 | 40 | Performed | 230 | Example |
| 11 | K | 55 | 850 | 20 | 280 | 80 | 760 | 360 | 80 | Performed | 160 | Example |
| 12 | L | 45 | 840 | 15 | 270 | 390 | 750 | 540 | 70 | Performed | 250 | Example |
| 13 | M | 50 | 860 | 35 | 330 | 420 | 730 | 470 | 460 | Performed | 370 | Example |
| 14 | N | 60 | 870 | 30 | 310 | 30 | 750 | 310 | 310 | Performed | 310 | Example |
| 15 | O | 55 | 850 | 25 | 300 | 40 | 740 | 320 | 120 | Performed | 200 | Example |
| 16 | P | 45 | 840 | 20 | 270 | 450 | 780 | 450 | 50 | Performed | 400 | Example |
| 17 | Q | 40 | 870 | 40 | 340 | 130 | 750 | 350 | 60 | Performed | 280 | Example |
| 18 | <u>R</u> | 50 | 940 | 35 | 330 | 100 | 820 | 340 | 210 | Performed | 410 | Comparative Example |
| 19 | <u>S</u> | 70 | 810 | 20 | 280 | 150 | 700 | 400 | 100 | Performed | 210 | Comparative Example |
| 20 | <u>T</u> | 35 | 790 | 35 | 330 | 750 | 700 | 520 | 130 | Performed | 160 | Comparative Example |
| 21 | <u>U</u> | 70 | 870 | 15 | 270 | 30 | 760 | 310 | 250 | Performed | 430 | Comparative Example |
| 22 | <u>V</u> | 50 | 880 | 30 | 300 | 180 | 760 | 410 | 320 | Performed | 340 | Comparative Example |
| 23 | <u>W</u> | 45 | 830 | 35 | 320 | 150 | 690 | 360 | 50 | Performed | 160 | Comparative Example |
| 24 | <u>X</u> | 70 | 880 | 40 | 330 | 100 | 740 | 440 | 110 | Performed | 250 | Comparative Example |

TABLE 3

| | | | First annealing | | | | Second annealing | | | | Third | |
| No. | Steel sample ID | Cold rolling Rolling re- duction [%] | Annealing temperature $T_1$ [°C.] | Average cooling rate from $T_1$ to $T_2$ [°C./s] | Cooling stop temperature $T_2$ [°C.] | Holding time [s] | Annealing temperature $T_3$ [°C.] | Cooling stop temperature $T_4$ [°C.] | Holding time [s] | Cooling to room temperature | annealing Annealing temperature $T_5$ [°C.] | Remarks |
|---|---|---|---|---|---|---|---|---|---|---|---|---|
| 25 | A | <u>15</u> | 850 | 30 | 310 | 70 | 780 | 430 | 100 | Performed | 190 | Comparative Example |
| 26 | A | 60 | <u>790</u> | 15 | 260 | 200 | 740 | 490 | 90 | Performed | 220 | Comparative Example |
| 27 | A | 45 | <u>990</u> | 25 | 290 | 160 | 760 | 370 | 680 | Performed | 450 | Comparative Example |
| 28 | A | 55 | 900 | <u>6</u> | 330 | 80 | 740 | 350 | 120 | Performed | 340 | Comparative Example |
| 29 | A | 45 | 870 | 30 | <u>190</u> | 480 | 760 | 440 | 110 | Performed | 150 | Comparative Example |
| 30 | A | 40 | 830 | 25 | <u>360</u> | 200 | 770 | 380 | 80 | Performed | 200 | Comparative Example |
| 31 | A | 40 | 820 | 20 | 270 | <u>5</u> | 760 | 350 | 190 | Performed | 290 | Comparative Example |
| 32 | A | 45 | 850 | 30 | 310 | 30 | <u>660</u> | 310 | 450 | Performed | 370 | Comparative Example |
| 33 | A | 45 | 830 | 25 | 290 | 80 | <u>840</u> | 500 | 140 | Performed | 350 | Comparative Example |
| 34 | A | 70 | 850 | 35 | 320 | 80 | 730 | <u>270</u> | 320 | Performed | 400 | Comparative Example |
| 35 | B | 30 | 820 | 20 | 270 | 100 | 770 | <u>570</u> | 590 | Performed | 380 | Comparative Example |
| 36 | B | 50 | 830 | 25 | 300 | 110 | 750 | 360 | <u>5</u> | Performed | 150 | Comparative Example |
| 37 | B | 45 | 840 | 35 | 320 | 250 | 750 | 410 | 270 | <u>No: cooled to 400° C.</u> | 210 | Comparative Example |
| 38 | B | 45 | 830 | 20 | 280 | 490 | 750 | 450 | 60 | <u>No: cooled to 250° C.</u> | 330 | Comparative Example |
| 39 | B | 50 | 830 | 25 | 280 | 220 | 740 | 380 | 210 | Performed | <u>60</u> | Comparative Example |
| 40 | B | 45 | 820 | 20 | 270 | 50 | 750 | 330 | 90 | Performed | <u>580</u> | Comparative Example |
| 41 | B | 40 | 850 | 20 | 280 | 180 | 750 | 430 | 430 | Performed | — | Comparative Example |
| 42 | A | 65 | 840 | 30 | 260 | 450 | 740 | 450 | 130 | Performed | 420 | Example |
| 43 | A | 60 | 830 | 25 | 290 | 20 | 740 | 430 | 700 | Performed | 440 | Example |
| 44 | A | 60 | 860 | 20 | 270 | 1600 | 740 | 380 | 150 | Performed | 200 | Example |
| 45 | B | 50 | 860 | 20 | 280 | 1420 | 750 | 360 | 1530 | Performed | 210 | Example |
| 46 | B | 50 | 850 | 20 | 280 | 60 | 750 | 350 | 420 | Performed | 520 | Example |
| 47 | B | 35 | 810 | 20 | 280 | 170 | 770 | 530 | 1520 | Performed | 130 | Example |

TABLE 4

| | Steel sheet | | Microstructure * | | | | | | | Evaluation results | | | | |
|---|---|---|---|---|---|---|---|---|---|---|---|---|---|---|
| No. | Steel sample ID | Type | F + BF Area ratio [%] | TM Area ratio [%] | RA Area ratio [%] | Others | R1 Area ratio [%] | R2 Area ratio [%] | Average KAM value of bcc phase [°] | TS [MPa] | El [%] | Average λ [%] | Failure rate in hole expanding test [%] | Remarks |
| 1 | A | CR | 26 | 42 | 32 | — | 84 | 66 | 0.52 | 1572 | 18 | 11 | 0 | Example |
| 2 | B | GA | 42 | 31 | 27 | — | 88 | 76 | 0.78 | 1401 | 24 | 18 | 0 | Example |
| 3 | C | GI | 26 | 40 | 34 | — | 94 | 63 | 0.60 | 1484 | 23 | 13 | 1 | Example |
| 4 | D | CR | 39 | 32 | 29 | — | 81 | 65 | 0.57 | 1384 | 23 | 18 | 0 | Example |
| 5 | E | GI | 24 | 44 | 32 | — | 93 | 61 | 0.49 | 1588 | 19 | 10 | 1 | Example |
| 6 | F | GA | 45 | 32 | 23 | — | 90 | 66 | 0.60 | 1387 | 25 | 19 | 0 | Example |
| 7 | G | CR | 37 | 32 | 31 | — | 86 | 75 | 0.38 | 1446 | 22 | 14 | 0 | Example |
| 8 | H | EG | 23 | 48 | 29 | — | 93 | 69 | 0.91 | 1588 | 19 | 13 | 0 | Example |
| 9 | I | CR | 14 | 53 | 33 | — | 76 | 68 | 0.38 | 1715 | 13 | 8 | 2 | Example |
| 10 | J | CR | 40 | 31 | 29 | — | 81 | 66 | 0.50 | 1345 | 24 | 20 | 0 | Example |
| 11 | K | CR | 14 | 47 | 39 | — | 91 | 74 | 0.24 | 1597 | 19 | 9 | 0 | Example |
| 12 | L | GA | 43 | 30 | 27 | — | 78 | 70 | 0.54 | 1364 | 23 | 20 | 2 | Example |
| 13 | M | GI | 33 | 39 | 28 | — | 91 | 69 | 0.49 | 1500 | 21 | 14 | 0 | Example |
| 14 | N | CR | 15 | 46 | 39 | — | 88 | 82 | 0.43 | 1612 | 17 | 9 | 0 | Example |
| 15 | O | GI | 20 | 44 | 36 | — | 82 | 92 | 0.53 | 1550 | 18 | 12 | 0 | Example |
| 16 | P | CR | 18 | 52 | 30 | — | 80 | 58 | 0.64 | 1702 | 14 | 11 | 1 | Example |
| 17 | Q | CR | 18 | 52 | 30 | — | 76 | 83 | 0.73 | 1646 | 14 | 13 | 2 | Example |
| 18 | <u>R</u> | CR | <u>81</u> | <u>11</u> | <u>8</u> | — | 83 | 60 | 0.29 | 962 | 28 | 33 | 2 | Comparative Example |
| 19 | <u>S</u> | CR | <u>12</u> | <u>67</u> | 21 | — | 79 | 91 | 0.47 | 1521 | 12 | 7 | 2 | Comparative Example |
| 20 | <u>T</u> | CR | 42 | 41 | <u>9</u> | P | 94 | 81 | 0.38 | 1544 | 11 | 10 | 0 | Comparative Example |
| 21 | <u>U</u> | CR | 38 | 35 | 27 | — | 94 | 68 | 0.54 | 1431 | 14 | 13 | 0 | Comparative Example |
| 22 | <u>V</u> | CR | <u>82</u> | <u>9</u> | <u>9</u> | — | 87 | 62 | 0.57 | 974 | 22 | 36 | 1 | Comparative Example |
| 23 | <u>W</u> | CR | <u>12</u> | <u>72</u> | 16 | — | 81 | 81 | 0.62 | 1705 | 9 | 5 | 0 | Comparative Example |
| 24 | <u>X</u> | CR | 41 | 25 | 34 | — | 83 | 63 | 0.34 | 1304 | 26 | 17 | 2 | Comparative Example |

* F: Ferrite,
BF: Bainitic ferrite,
TM: Tempered martensite,
RA: Retained austenite,
P: Pearlite

TABLE 5

| | Steel sheet | | Microstructure * | | | | | | | Evaluation results | | | | |
|---|---|---|---|---|---|---|---|---|---|---|---|---|---|---|
| No. | Steel sample ID | Type | F + BF Area ratio [%] | TM Area ratio [%] | RA Area ratio [%] | Others | R1 Area ratio [%] | R2 Area ratio [%] | Average KAM value of bcc phase [°] | TS [MPa] | El [%] | Average λ [%] | Failure rate in hole expanding test [%] | Remarks |
| 25 | A | CR | 36 | 42 | 22 | — | <u>55</u> | 79 | 0.85 | 1542 | 9 | 15 | 5 | Comparative Example |
| 26 | A | CR | 33 | 32 | 35 | — | <u>50</u> | 68 | 0.36 | 1444 | 11 | 13 | 6 | Comparative Example |
| 27 | A | CR | 34 | 37 | 29 | — | <u>52</u> | 76 | 0.57 | 1452 | 12 | 17 | 5 | Comparative Example |
| 28 | A | CR | 36 | 38 | 26 | — | <u>59</u> | 64 | 0.54 | 1534 | 10 | 13 | 4 | Comparative Example |
| 29 | A | CR | 39 | 36 | 25 | — | <u>55</u> | 73 | 0.75 | 1499 | 10 | 16 | 6 | Comparative Example |
| 30 | A | CR | 32 | 40 | 28 | — | 93 | <u>44</u> | 0.66 | 1516 | 21 | 13 | 4 | Comparative Example |
| 31 | A | CR | 30 | 41 | 29 | — | <u>56</u> | 74 | 0.58 | 1510 | 11 | 13 | 5 | Comparative Example |
| 32 | A | CR | 67 | 26 | <u>7</u> | — | 75 | 58 | 0.60 | 1159 | 17 | 29 | 2 | Comparative Example |
| 33 | A | CR | 30 | 47 | 23 | — | <u>61</u> | <u>46</u> | 0.74 | 1600 | 10 | 14 | 6 | Comparative Example |
| 34 | A | CR | 17 | <u>73</u> | <u>10</u> | — | 79 | 66 | 0.58 | 1559 | 11 | 6 | 1 | Comparative Example |
| 35 | B | CR | 47 | 33 | <u>9</u> | P | 88 | 74 | 0.62 | 1360 | 14 | 21 | 0 | Comparative Example |
| 36 | B | CR | 28 | <u>63</u> | <u>9</u> | — | 87 | 55 | 0.51 | 1399 | 13 | 9 | 2 | Comparative Example |
| 37 | B | CR | 35 | 33 | 32 | — | 83 | 68 | <u>1.42</u> | 1432 | 22 | 15 | 7 | Comparative Example |
| 38 | B | CR | 36 | 29 | 35 | — | 76 | 75 | <u>1.23</u> | 1341 | 23 | 21 | 5 | Comparative Example |
| 39 | B | CR | 46 | 28 | 26 | — | 77 | 69 | <u>1.06</u> | 1369 | 22 | 16 | 4 | Comparative Example |
| 40 | B | CR | 49 | 35 | <u>9</u> | P | 83 | 75 | 0.59 | 1346 | 14 | 21 | 0 | Comparative Example |
| 41 | B | CR | 42 | 39 | 19 | — | 75 | 86 | <u>1.24</u> | 1478 | 18 | 15 | 5 | Comparative Example |
| 42 | A | EG | 27 | 42 | 31 | — | 71 | 61 | 0.41 | 1487 | 17 | 14 | 3 | Example |
| 43 | A | CR | 26 | 46 | 28 | — | 72 | 57 | 0.49 | 1616 | 13 | 10 | 3 | Example |
| 44 | A | CR | 29 | 45 | 26 | — | 77 | 72 | 0.61 | 1575 | 18 | 13 | 1 | Example |

TABLE 5-continued

| | Steel sheet | | Microstructure * | | | | | | Evaluation results | | | | |
|---|---|---|---|---|---|---|---|---|---|---|---|---|---|
| | | | F + BF | TM | RA | | R1 | R2 | Average KAM value | | | | Failure rate in hole |
| No. | Steel sample ID | Type | Area ratio [%] | Area ratio [%] | Area ratio [%] | Others | Area ratio [%] | Area ratio [%] | of bcc phase [°] | TS [MPa] | El [%] | Average λ [%] | expanding test [%] | Remarks |
| 45 | B | GA | 47 | 29 | 24 | — | 80 | 76 | 0.47 | 1379 | 24 | 17 | 0 | Example |
| 46 | B | EG | 44 | 36 | 17 | P | 75 | 74 | 0.71 | 1401 | 18 | 17 | 2 | Example |
| 47 | B | CR | 41 | 36 | 23 | — | 92 | 87 | 0.65 | 1347 | 27 | 20 | 0 | Example |

Figure 1:
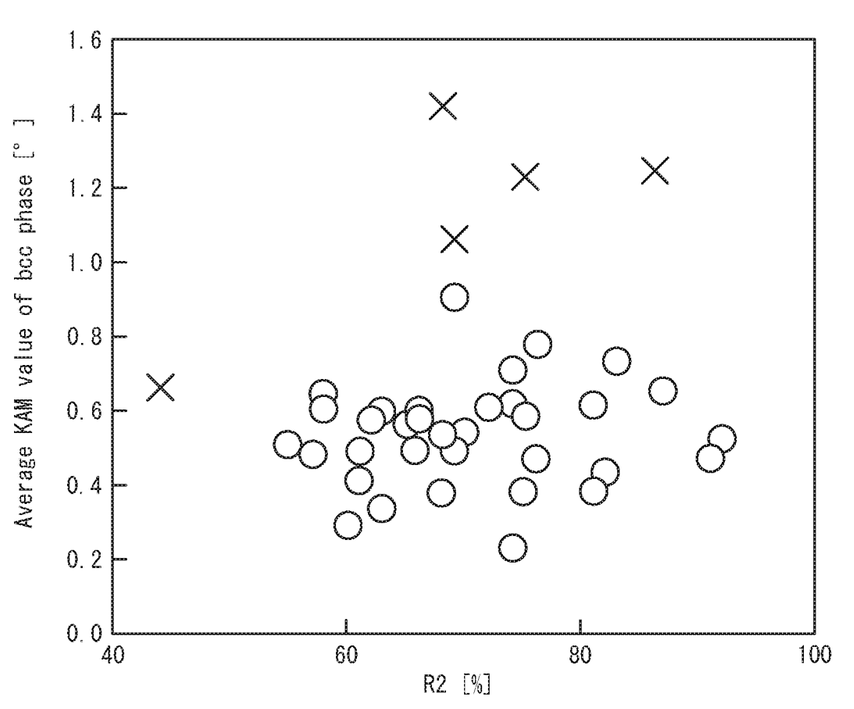
FIG. 1 is a graph illustrating the influences that the ratio of retained austenite with an aspect ratio of 0.6 or less existing in ferrite grain boundaries with an orientation difference of 40° or more to retained austenite with an aspect ratio of 0.6 or less and the average KAM value of bcc phase have on the failure rate in the hole expanding test.

* F: Ferrite,
BF: Bainitic ferrite,
TM: Tempered martensite,
RA: Retained austenite,
P: Pearlite FIG. 1 is a graph in which part of the results of Tables 4 and 5 is plotted. In more detail, FIG. 1 is a graph illustrating the influences that the ratio (R2) of retained austenite with an aspect ratio of 0.6 or less existing in ferrite grain boundaries with an orientation difference of 40° or more to retained austenite with an aspect ratio of 0.6 or less and the average KAM value of bcc phase have on the failure rate in the hole expanding test. In FIG. 1, each circle mark indicates that the failure rate in the hole expanding test was 4% or less, and each cross mark indicates that the failure rate in the hole expanding test was more than 4%. The graph in FIG. 1 illustrates samples in which the ratio of retained austenite with an aspect ratio of 0.6 or less to retained austenite was 75% or more.

As illustrated in the graph in FIG. 1, a steel sheet having a low failure rate in the hole expanding test was obtained only in the case where R2 was 50% or more and the average KAM value of bcc phase was 1° or less.

As is clear from Tables 1 to 5 and FIG. 1, all cold-rolled steel sheets satisfying the conditions according to the present disclosure had high strength, i.e. a tensile strength (TS) of 1320 MPa or more, favorable ductility and stretch flangeability, and a low failure rate in the hole expanding test. On the other hand, the cold-rolled steel sheets of comparative examples not satisfying the conditions according to the present disclosure were inferior in at least one of these properties.

The invention claimed is:

1. A high-strength cold-rolled steel sheet comprising:
a composition containing, in mass %,
C: more than 0.18% and 0.45% or less,
Si: 0.5% or more and 2.5% or less,
Mn: more than 2.5% and 4.0% or less,
P: 0.05% or less,
S: 0.01% or less,
Al: 0.01% or more and 0.1% or less, and
N: 0.01% or less,
with a balance consisting of Fe and inevitable impurities, C content and Mn content satisfying the following formula (1)

$$7.5C + Mn \geq 5.0 \quad (1)$$

where C and Mn respectively denote the C content and the Mn content in mass %; and
a microstructure in which:
a total area ratio of ferrite and bainitic ferrite is 10% or more and 50% or less;
an area ratio of retained austenite is more than 15% and 50% or less;
an area ratio of tempered martensite is 31% or more and 60% or less;
a ratio of retained austenite with an aspect ratio of 0.6 or less to the retained austenite is 70% or more in area ratio;
a ratio of retained austenite with an aspect ratio of 0.6 or less existing in ferrite grain boundaries with an orientation difference of 40° or more to the retained austenite with an aspect ratio of 0.6 or less is 50% or more in area ratio; and
an average KAM value of bcc phase is 1° or less, and the high-strength cold-rolled steel sheet has a tensile strength of 1320 MPa or more.

2. The high-strength cold-rolled steel sheet according to claim 1, wherein the composition further contains, in mass %, at least one selected from the group consisting of
Ti: 0.005% or more and 0.035% or less,
Nb: 0.005% or more and 0.035% or less,
V: 0.005% or more and 0.035% or less,
Mo: 0.005% or more and 0.035% or less,
B: 0.0003% or more and 0.01% or less,
Cr: 0.05% or more and 1.0% or less,
Ni: 0.05% or more and 1.0% or less,
Cu: 0.05% or more and 1.0% or less,
Sb: 0.002% or more and 0.05% or less,
Sn: 0.002% or more and 0.05% or less,
Ca: 0.0005% or more and 0.005% or less,
Mg: 0.0005% or more and 0.005% or less, and
REM: 0.0005% or more and 0.005% or less.

3. The high-strength cold-rolled steel sheet according to claim 1, comprising
a coated or plated layer at a surface thereof.

4. The high-strength cold-rolled steel sheet according to claim 2, comprising
a coated or plated layer at a surface thereof.

5. A method for manufacturing the high-strength cold-rolled steel sheet according to claim 1, the method comprising: hot rolling a steel material having the composition according to claim 1, to obtain a hot-rolled steel sheet; pickling the hot-rolled steel sheet; cold rolling the hot-rolled steel sheet that has been pickled at a rolling reduction of 30% or more, to obtain a cold-rolled steel sheet; heating the cold-rolled steel sheet at an annealing temperature $T_1$ of $A_{c3}$ point or more and 950° C. or less, cooling the cold-rolled steel sheet from the annealing temperature $T_1$ to a cooling stop temperature $T_2$ of 250° C. or more and less than 350°

C. at an average cooling rate of more than 10° C./sec, and holding the cold-rolled steel sheet at the cooling stop temperature $T_2$ for 10 sec or more, to obtain a first cold-rolled and annealed sheet; heating the first cold-rolled and annealed sheet at an annealing temperature $T_3$ of 680° C. or more and 820° C. or less, cooling the first cold-rolled and annealed sheet from the annealing temperature $T_3$ to a cooling stop temperature $T_4$ of 300° C. or more and 550° C. or less, holding the first cold-rolled and annealed sheet at the cooling stop temperature $T_4$ for 10 sec or more, and cooling the first cold-rolled and annealed sheet to a room temperature, to obtain a second cold-rolled and annealed sheet; and heating the second cold-rolled and annealed sheet at an annealing temperature $T_S$ of 100° C. or more and 550° C. or less, to obtain a third cold-rolled and annealed sheet; thereby producing the high-strength cold-rolled steel sheet according to claim 1.

6. A method for manufacturing the high-strength cold-rolled steel sheet according to claim 2, the method comprising: hot rolling a steel material having the composition according to claim 2, to obtain a hot-rolled steel sheet; pickling the hot-rolled steel sheet; cold rolling the hot-rolled steel sheet that has been pickled at a rolling reduction of 30% or more, to obtain a cold-rolled steel sheet; heating the cold-rolled steel sheet at an annealing temperature $T_1$ of $A_{c3}$ point or more and 950° C. or less, cooling the cold-rolled steel sheet from the annealing temperature $T_1$ to a cooling stop temperature $T_2$ of 250° C. or more and less than 350° C. at an average cooling rate of more than 10° C./sec, and holding the cold-rolled steel sheet at the cooling stop temperature $T_2$ for 10 sec or more, to obtain a first cold-rolled and annealed sheet; heating the first cold-rolled and annealed sheet at an annealing temperature $T_3$ of 680° C. or more and 820° C. or less, cooling the first cold-rolled and annealed sheet from the annealing temperature $T_3$ to a cooling stop temperature $T_4$ of 300° C. or more and 550° C. or less, holding the first cold-rolled and annealed sheet at the cooling stop temperature $T_4$ for 10 sec or more, and cooling the first cold-rolled and annealed sheet to a room temperature, to obtain a second cold-rolled and annealed sheet; and heating the second cold-rolled and annealed sheet at an annealing temperature $T_S$ of 100° C. or more and 550° C. or less, to obtain a third cold-rolled and annealed sheet; thereby producing the high-strength cold-rolled steel sheet according to claim 2.

7. The method for manufacturing the high-strength cold-rolled steel sheet according to claim 5, further comprising subjecting the second cold-rolled and annealed sheet or the third cold-rolled and annealed sheet to a coating or plating treatment.

8. The method for manufacturing the high-strength cold-rolled steel sheet according to claim 6, further comprising subjecting the second cold-rolled and annealed sheet or the third cold-rolled and annealed sheet to a coating or plating treatment.

\* \* \* \* \*